US012780703B2

(12) United States Patent
Cote

(10) Patent No.: US 12,780,703 B2
(45) Date of Patent: Nov. 3, 2026

(54) SYSTEMS AND METHODS FOR UPGRADING CONVENTIONAL ACTIVATED SLUDGE PLANTS

(71) Applicant: BL TECHNOLOGIES, INC., Minnetonka, MN (US)

(72) Inventor: Pierre Lucien Cote, Dundas (CA)

(73) Assignee: BL TECHNOLOGIES, INC., Minnetonka, MN (US)

( * ) Notice: Subject to any disclaimer, the term of this patent is extended or adjusted under 35 U.S.C. 154(b) by 0 days.

(21) Appl. No.: 16/606,195

(22) PCT Filed: Apr. 21, 2017

(86) PCT No.: PCT/US2017/029008
§ 371 (c)(1),
(2) Date: Oct. 17, 2019

(87) PCT Pub. No.: WO2018/194690
PCT Pub. Date: Oct. 25, 2018

(65) Prior Publication Data

US 2020/0131066 A1 Apr. 30, 2020

(51) Int. Cl.

*C02F 3/12* (2023.01)
*B01D 61/14* (2006.01)
*B01D 61/16* (2006.01)

(52) U.S. Cl.

CPC .......... *C02F 3/1273* (2013.01); *B01D 61/145* (2013.01); *B01D 61/147* (2013.01);
(Continued)

(58) Field of Classification Search

CPC ............ B01D 2311/08; B01D 2311/25; B01D 2311/2688; B01D 2315/06; B01D 61/145;
(Continued)

(56) References Cited

U.S. PATENT DOCUMENTS

| | | | |
|---|---|---|---|
| 6,645,374 | B2 | 11/2003 | Cote |
| 6,814,868 | B2 | 11/2004 | Phagoo |

(Continued)

FOREIGN PATENT DOCUMENTS

| | | | |
|---|---|---|---|
| CN | 102126812 | A | 7/2011 |
| CN | 103991959 | A | 8/2014 |

(Continued)

OTHER PUBLICATIONS

Xin Yang, Riley C. Flowers, Howard S. Weinberg, Philip C. Singer, Occurrence and removal of pharmaceuticals and personal care products (PPCPs) in an advanced wastewater reclamation plant, Water Research, vol. 45, Issue 16, 2011, pp. 5218-5228. (Year: 2011).*

Mohamed F. Hamoda, Hamed A. Al-Sharekh; Performance of a combined biofilm-suspended growth system for wastewater treatment. Water Sci Technol Jan. 1, 2000; 41 (1): 167-175. (Year: 2000).*

(Continued)

*Primary Examiner* — Pranav N Patel

(57) ABSTRACT

A conventional activated sludge wastewater treatment plant is upgraded by adding one or more of a membrane filtration unit, a membrane aerated biofilm reactor (MABR) unit, and a screen. The membrane filtration unit is added between a process tank and the secondary clarifier. The membrane filtration unit extracts treated effluent at a rate up to 25% of the influent flow rate. The plant is not converted into a membrane bioreactor (MBR) since the MLSS concentration is still less than 4,000 mg/L. The membrane-aerated biofilm reactor (MABR) unit is added to a process tank of the plant and provides attached growth biological treatment. The screen extracts solids from water flowing to the process tanks. When optionally used in combination, the added units and processes increase the capacity of the primary separation, biological processing and secondary separation functions of the plant. The influent flow rate may be increased.

9 Claims, 2 Drawing Sheets

(52) U.S. Cl.
CPC .............. *B01D 61/16* (2013.01); *C02F 3/121* (2013.01); *C02F 3/1221* (2013.01); *B01D 2311/08* (2013.01); *B01D 2311/25* (2013.01); *B01D 2311/2688* (2013.01); *B01D 2315/06* (2013.01); *C02F 2301/043* (2013.01)

(58) Field of Classification Search
CPC .................. B01D 61/147; B01D 61/16; C02F 2301/043; C02F 2303/24; C02F 3/102; C02F 3/121; C02F 3/1221; C02F 3/1273; C02F 3/208; Y02W 10/10
See application file for complete search history.

(56) References Cited

U.S. PATENT DOCUMENTS

| | | | | |
|---|---|---|---|---|
| 6,942,786 | B1 | 9/2005 | Fosseng | |
| 7,344,643 | B2 | 3/2008 | Elefritz, Jr. et al. | |
| 2006/0113244 | A1* | 6/2006 | Johnson | C02F 3/1268<br>210/607 |
| 2007/0051677 | A1 | 3/2007 | Curtis et al. | |
| 2007/0163959 | A1 | 7/2007 | Cote et al. | |
| 2008/0047896 | A1* | 2/2008 | Johnson | C02F 3/12<br>210/253 |
| 2009/0211971 | A1* | 8/2009 | Kraft | C02F 3/082<br>210/619 |
| 2011/0174709 | A1 | 7/2011 | Mori et al. | |
| 2013/0264280 | A1* | 10/2013 | Zhao | C02F 3/307<br>210/605 |
| 2014/0083936 | A1* | 3/2014 | Murthy | C02F 3/1205<br>210/605 |
| 2016/0002081 | A1* | 1/2016 | Cote | C02F 11/02<br>210/151 |
| 2016/0272521 | A1* | 9/2016 | Murthy | C02F 3/307 |

FOREIGN PATENT DOCUMENTS

| | | | |
|---|---|---|---|
| CN | 204999776 | U | 1/2016 |
| JP | 61181595 | * | 8/1986 |
| WO | 03002468 | A1 | 1/2003 |
| WO | WO2007065956 | * | 6/2007 |
| WO | 2015/142586 | A2 | 9/2015 |

OTHER PUBLICATIONS

Jeff Peters et. al., Nutrient Removal Intensification with MABR—Developing a Process Model Supported by Piloting, Article in Proceedings of the Water Environment Federation . Jan. 2017 DOI: 10.2175/193864717821494204 (Year: 2017).*

International Patent Application No. PCT/US2017/029008, International Search Report and Written Opinion dated Aug. 23, 2017.

International Patent Application No. PCT/US2017/029008, International Preliminary Report on Patentability dated Oct. 31, 2019.

Proteus Waters, "Technical Information. Membrane Bioreactor", http://www.proteuswaters.com/info.html, retrieved Jun. 30, 2017, 2 pages.

Cote et al., "Comparison of Membrane Options for Water Reuse and Reclamation", IDS 6th Annual Conf., Upgrading Groundwater and Recycled Water by Desalination, Dec. 16-17, 2003, p. 103-117 http://gwri-ic.technion.ac.il/main.php?location=biblio&action=biblio_hit&id=19118&lib=0, retrieved Jun. 30, 2017.

European Patent Application No. 17906310.2, Office Action dated Nov. 23, 2020.

European Patent Application No. 17906310.2, Supplementary European Search Report dated Nov. 13, 2020.

European Patent Application No. 17906310.2, Office Action dated Jan. 26, 2022.

Chinese Patent Application No. 201780089867.0, Office Action dated Oct. 8, 2021.

Chinese Patent Application No. 201780089867.0, Office Action dated Mar. 18, 2022.

Chinese Patent Application No. 201780089867.0, Office Action dated Sep. 30, 2022.

Canadian Patent Application No. 3,060,400, Office Action dated Dec. 8, 2022.

Australian Patent Application No. 2017410202, Examination Report No. 1 dated Feb. 23, 2023.

Canadian Patent Application No. 3,060,400, Office Action dated Mar. 14, 2024.

Canadian Patent Application No. 3,060,400, Office Action dated Jun. 16, 2023.

European Patent Application No. 17906310.2, Summons to Attend Oral Proceedings dated May 19, 2023.

Chinese Patent Application No. 201780089867.0, Office Action dated Feb. 4, 2026.

* cited by examiner

SYSTEMS AND METHODS FOR UPGRADING CONVENTIONAL ACTIVATED SLUDGE PLANTS

CROSS-REFERENCE TO RELATED APPLICATIONS

This application is a National Stage Entry of International Application No. PCT/US2017/029008, filed Apr. 21, 2017.

FIELD

This specification relates to treating wastewater such as sewage or industrial wastewater using an activated sludge process.

BACKGROUND

The activated sludge process is a biological treatment process that is standard practice in many countries of the world. In a conventional activated sludge wastewater treatment plant (WWTP), wastewater passes through one or more biological process tanks maintained under various states of oxidation and mixing. Organisms grow in suspension in the process tanks. The combination of wastewater and organisms is called mixed liquor. The mixed liquor is separated in a secondary clarifier to produce a treated effluent and activated sludge. A portion of the activated sludge (return activated sludge or RAS) is recycled to one or more of the process tanks. Another portion of the activated sludge (waste activated sludge or WAS) is wasted. The recycle of activate sludge causes the retention time of the organisms to be greater than the hydraulic retention time of the plant. The mixed liquor suspended solids (MLSS) concentration is typically less than 4000 mg/L. Optionally the wastewater passes through a primary clarifier before being treated in the process tanks. The primary clarifier produces primary sludge and primary effluent. The primary effluent flows to the process tanks.

INTRODUCTION

This specification describes systems of methods that can be added to a conventional activated sludge (CAS) plant to upgrade it. The upgraded plant may produce effluent of a higher quality or treat wastewater at a higher rate or both. The various systems and methods described herein can be used individual or in any combination of two or more of them.

In one example, a membrane filtration unit is added between the process tanks and the secondary clarifier. At that point, biological treatment is essentially complete, or at least essentially as complete as it will be in the secondary clarifier. The membrane filtration unit extracts treated effluent from the mixed liquor before secondary clarification. The treated effluent extracted through the membrane filtration unit may be mixed with the treated effluent from the secondary clarifier. Extracting treated effluent as permeate from the membrane filtration unit reduces the hydraulic loading rate, or both the hydraulic and solids loading rates, of the secondary clarifier depending on whether solids rejected by the membrane are sent to the secondary clarifier or to the return activated sludge (RAS) line. The amount of treated effluent extracted by membrane filtration is preferably lower than 25% of the influent flow rate. The plant is not converted into a membrane bioreactor (MBR) as the system is run under CAS operating conditions (e.g., MLSS <4,000 mg/L).

In another example, a membrane-aerated biofilm reactor (MABR) unit is added to the plant, for example by being immersed in a process tank. The MABR unit adds biological treatment by attached growth to the conventional suspended growth.

In another example, one or more screens, for example micro-screens, are added to extract solids from water flowing in or to the process tanks. In one option, a micro-screen is added in parallel with a primary clarifier. In another option, a portion of the RAS is screened before being returned to the process tanks. Using either or both of these methods reduces the solids loading of the process tanks.

When used in combination, the units described above and their corresponding processes increase the capacity of the primary separation, biological processing and secondary separation functions of the plant. The influent flow rate to the plant may be increased.

DETAILED DESCRIPTION

Conventional activated sludge (CAS) is a common wastewater biological treatment process. A CAS typically has three treatment steps although the primary treatment step described below can optionally be omitted. Pre-treatment removes larger particles with mechanical means such as coarse screening, grit removal and oil & grease flotation. Primary treatment, typically in a clarifier, removes suspended solids including some organic matter by physical separation. One or more biological reactors removing organic matter (e.g., COD/BOD) using microorganisms, typically under aerobic conditions in at least one reactor. The biological reactors may also include multiple zones or tanks, optionally with one or more recycle loops between them, where the environmental conditions are controlled (i.e between aerobic, anoxic and anaerobic conditions) to favor different biological pathways to remove nutrients such as nitrogen and phosphorous. Secondary treatment, typically in a clarifier, separates the mixed liquor suspended solids (MLSS) from the final effluent, recycles a portion as return activated sludge (RAS) and wastes a portion (WAS) to control the sludge retention time (SRT).

Figure 1:
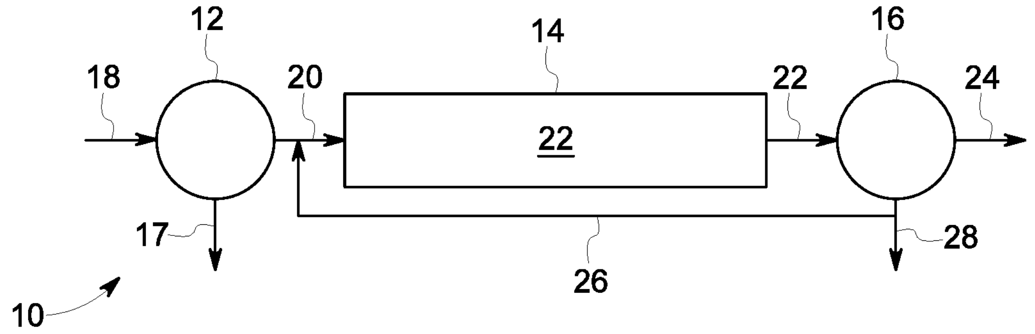
FIG. 1 PRIOR ART
FIG. 1 is a schematic process flow diagram of a conventional activated sludge plant according to prior art.

The wastewater treatment plant (WWTP) 10 shown in FIG. 1 is an example of a conventional CAS plant. The treatment units include a primary clarifier 12, a process tank 14 and a secondary clarifier 16. Although only one process tank 14 is shown, there could optionally be multiple process tanks or other forms of biological reactors. When there is only one process tank 14 it is typically aerated to provide suspended growth under aerobic conditions. Influent wastewater 18, optionally pre-treated, flows into primary clarifier 12. Primary sludge 17 is separated from primary effluent 20. Primary effluent 20 flows into process tank 14 and becomes part of the mixed liquor 22 therein. Mixed liquor 22 also flows to secondary clarifier 16 where it is separated into activated sludge and treated effluent 24. Optionally, waste activated sludge (WAS) 28 leaves the plant 10. Return activated sludge (RAS) 26 is recycled to the process tank 14.

CAS plants often need to be upgraded or expanded. Upgrading is needed when the treatment objectives or effluent regulations become more stringent and the level of treatment achieved by the plant is not sufficient. Expansion is needed when the flow rate and/or pollutant concentration of the influent wastewater increases. Upgrading and expanding a CAS plant can be complex and expensive as it involves adding tankage and mechanical equipment. In many cases, the CAS plant is located at a site where there is very little room available.

A method of upgrading a CAS plant can involve adding one or more products to the CAS plant. These products target the three treatment steps (primary separation, biological treatment, secondary separation) described above. They can be used individually or in combinations of two or more of together. One type of product involves a micro-screen, alternatively called a micro-sieve, or other screen, which may be added to complement primary treatment, to otherwise reduce solids in the process tanks, or to protect added membranes from solids. Another type of product involves a medium to support attached growth, for example a membrane aerated biofilm module, to complement the biological reactor. Another type of product involves membrane filtration to complement secondary clarification. The primary clarifier in the examples described below is optional.

Micro-sieving, side-stream screening, MABR, and membrane filtration are described in other contexts in, for example, U.S. Pat. Nos. 6,942,786; 6,814,868; and, 6,645,374, which are incorporated herein by reference. In this specification they are used, optionally together, to upgrade or expand a CAS plant.

Figure 2A:
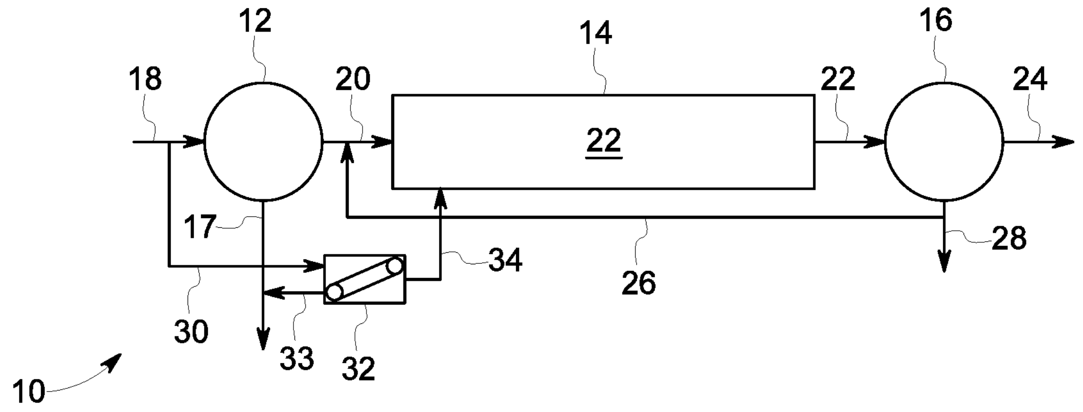
FIG. 2*a* is a schematic process flow diagram of a conventional activated sludge plant upgraded with primary micro-sieving.

In one example, use of a micro-sieving product involves installing a micro-sieve in parallel with primary treatment to remove suspended solids. In the example of FIG. 2A, a rotating belt sieve (RBS) 32 such as the LEAP PRIMARY RBS by GE Water is added but other configurations of micro-screens such as rotating drums or discs can be used. A micro-screen optionally has pores of about 300 microns or less, or about 200 microns or less, or about 100 microns or less. A portion 30 of influent wastewater 18 is diverted to the RBS 32. Micro-sieve sludge 33, containing solids rejected by the RBS 32, can be added to primary sludge 17. RBS effluent 34 flows to the process tank 14. A parallel micro-sieve can be run continuously, or only during peak periods to increase the hydraulic capacity of primary treatment. A parallel micro-sieve can alternatively facilitate adding chemically enhanced primary treatment, i.e. with phosphorous precipitating chemicals or polymers added to the influent wastewater 18, by countering the solids increase to the primary clarifier 12 that this would otherwise cause by diverting some of influent wastewater 18 from the primary clarifier 12.

Figure 2B:
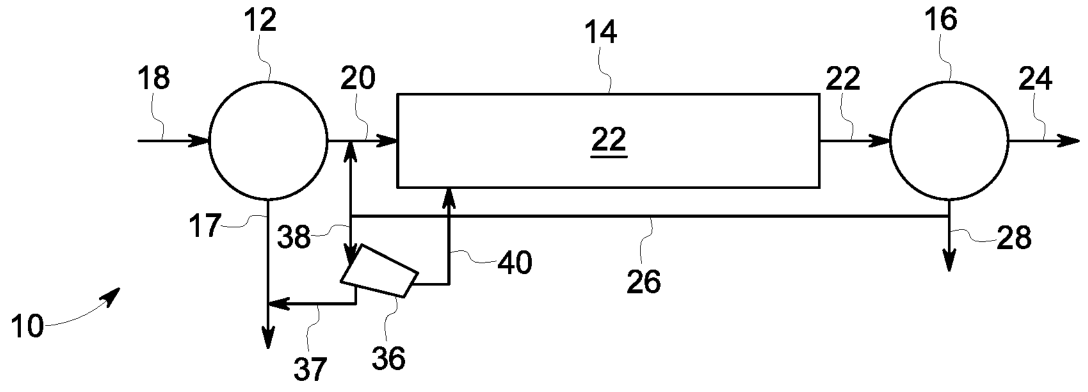
FIG. 2*b* is a schematic process flow diagram of a conventional activated sludge plant upgraded with side stream screening.

In another example, a micro-screen or other screen is used to extract solids from mixed liquor or RAS. Removing these solids may supplement primary treatment or provide a substitute for primary treatment if the plant has none. Alternatively or additionally, screening of the mixed liquor or RAS may remove trash and larger particles from the mixed liquor to protect membranes in, or added to, the plant. The screen optionally has pores of about 300 microns or less, or about 200 microns or less, or about 100 microns or less. In a case where only the membrane protection function is required, the screen can optionally have pores up to 1000 microns in size. In the example of FIG. 2B, a portion 38 of RAS 26 is diverted to a rotating drum screen 36. Solids 37 rejected by the screen 36 can be mixed with the primary sludge 17. Filtrate 40 flows to the process tank 14. This version of primary treatment upgrading or expansion is useful, for example, in conjunction with one or both of the two other types of product involving biofilm-supporting or filtering membranes if it is necessary to lower the trash contents of the mixed liquor to inhibit damage to membrane modules.

Figure 3:
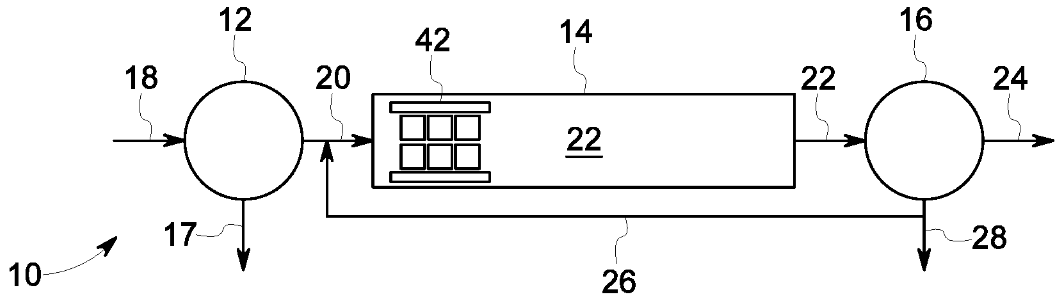
FIG. 3 is a schematic process flow diagram of a conventional activated sludge plant upgraded with MABR membranes.

Adding a supported biomass medium augments the biological treatment capacity of a plant 10. In the example of FIG. 3, a membrane aerated biofilm module (MABR) module 42 such as a ZEELUNG module by GE Water is immersed into the process tank 14. MABR modules provide additional nitrification and BOD removal capacity. In the example shown, the MABR module 42 is immersed into an anoxic zone at the front-end of process tank 14. Process tank 14 is aerobic downstream of the MABR module 42.

Figure 4A:
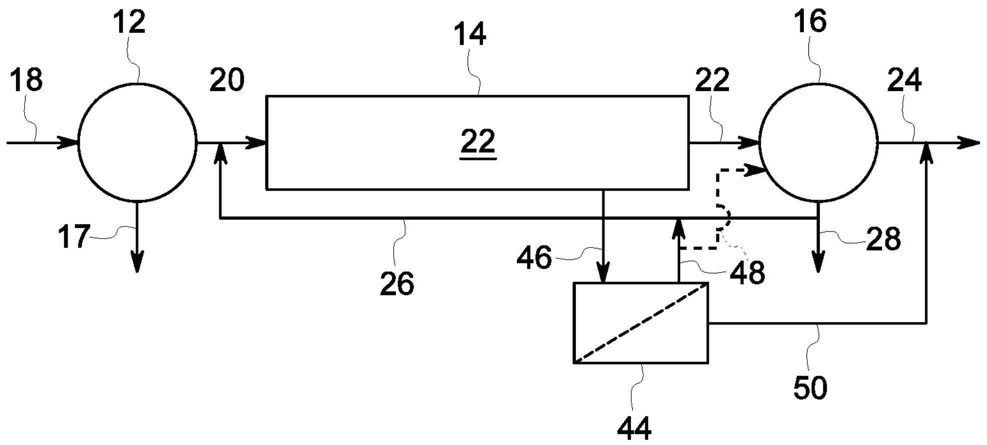
FIG. 4A is a schematic process flow diagram of a conventional activated sludge plant upgraded with membrane filtration with membranes outside of the biological reactor.

A membrane filtration product is used to extract treated effluent from the mixed liquor. One example of a membrane filtration product is a ZEEWEED immersed ultrafiltration (UF) or microfiltration (MF) module by GE Water. In the example of FIG. 4A, a membrane tank 44 is located outside of the process tank 14 and contains either immersed membranes in an open tank or membranes contained in a sealed tank. A portion 46 of mixed liquor 22 is pumped out of the end portion of the process tank 14 (where biological conversion is substantially complete), or the conduit between the process tank 14 and secondary clarifier 16, and processed through MF/UF membranes. Rejects 48 can be mixed with the RAS 26 or WAS 28. Adding membrane filtration in this way reduces both the hydraulic and solids loading rates to the secondary clarifier 16. Alternatively, some or all of rejects 48 can flow to secondary clarifier 16, which reduces the hydraulic loading to the secondary clarifier 16 but only reduces the solids loading to the secondary clarifier 16 to the extent that some of the rejects 48, if any, are mixed with RAS 26 or WAS 28. Permeate 50 can be mixed with treated effluent 24.

Figure 4B:
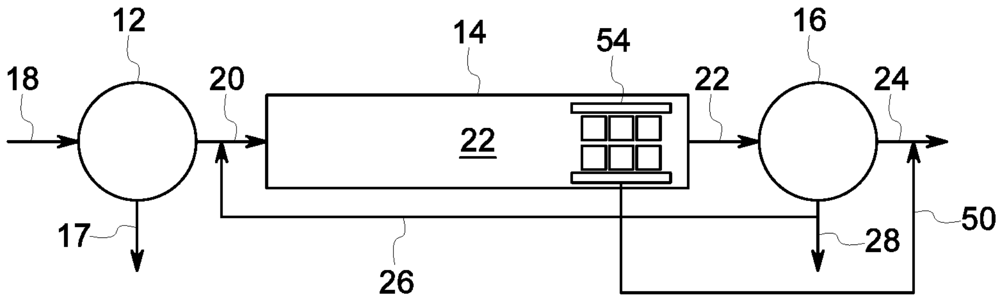
FIG. 4B is a schematic process flow diagram of a conventional activated sludge plant upgraded with membrane filtration with membranes inside the biological reactor.

In the example of FIG. 4B, a membrane module 54 is immersed directly in mixed liquor 22 of process tank 14. This avoids mixed liquor pumping and the need for additional tankage. In this case, the mixed liquor may be only slightly concentrated and flows to the secondary clarifiers. In this embodiment, adding membrane filtration only reduces the hydraulic loading rate to the secondary clarifiers.

In FIGS. 4A and 4B the permeate 50 is mixed with treated effluent 24 and improves the overall quality of the discharged effluent. Optionally, in either example, permeate 50 can be kept separate from treated effluent 24. Since the permeate 50 is of higher quality, it can be reused directly (e.g., for irrigation) or treated further with reverse osmosis for other types of reuse (e.g., groundwater recharge).

Adding filtration membranes to process a minor portion of the mixed liquor 22 does not convert the CAS plant into a membrane bioreactor (MBR). The fraction of the influent flow rate (Q) extracted as permeate 50 is limited to 25% (ore one third of treated effluent 24 discharged from secondary clarifier 16). The MLSS concentration of the mixed liquor 22 is optionally not increased or at least not materially increased. The MLSS concentration of the modified plant is about 2,000 to 4,000 mg/L, which is typical of a CAS, rather than 6,000 to 12,000 mg/L which is typical of an MBR.

Two or all three of the types of products can be combined to improve the use of existing infrastructure. While each existing CAS plant may be limited differently, it may be possible to address each limitation to increase plant throughput by up to 25%. Optionally, the products can be installed without materially interrupting the operation of the CAS plant. Both the MABR and filtration membranes can be deployed as floating cassettes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A wastewater treatment process comprising steps of:

biological treatment to produce mixed liquor;

separation of a first portion of the mixed liquor through an ultrafiltration or microfiltration membrane to produce an ultrafiltration or microfiltration permeate; and, separation of a second portion of the mixed liquor through a secondary clarifier to form an activated sludge and an effluent, wherein an extraction rate of the ultrafiltration or microfiltration permeate is limited to one third of an extraction rate of the effluent.

2. The process of claim 1 wherein the mixed liquor is limited to a suspended solids concentration of 4000 mg/L or less.

3. The process of claim 1 wherein solids separated by the ultrafiltration or microfiltration membrane mix with the activated sludge or flow to the secondary clarifier.

4. The process of claim 1 wherein solids separated by the ultrafiltration or microfiltration membrane are mixed with a waste activated sludge portion of the activated sludge from the secondary clarifier.

5. The process of claim 1 comprising micro-sieving influent wastewater in parallel with a primary clarifier before the biological treatment step wherein solids rejected in micro-sieving are diverted from the primary clarifier.

6. The process of claim 1 further comprising screening a portion of the activated sludge returned from the secondary clarifier to the biological treatment.

7. The process of claim 1 wherein the biological treatment comprises attached and suspended growth biological processes.

8. The process of claim 1 wherein the biological treatment comprises treatment with a membrane aerated biofilm reactor (MABR) module immersed in an anoxic zone at the front end of a process tank, wherein the process tank is aerobic downstream of the MABR module.

9. The process of claim 1 wherein the ultrafiltration or microfiltration membrane receives only a portion of the mixed liquor; and solids rejected by the membrane are directed to a waste activated sludge line.

* * * * *